US011602955B2

(12) United States Patent
Allouis (10) Patent No.: US 11,602,955 B2
(45) Date of Patent: Mar. 14, 2023

(54) WHEEL ASSEMBLY (71) Applicant: Airbus Defence and Space Limited, Hertfordshire (GB)

(72) Inventor: Elie Allouis, Hertfordshire (GB)

(73) Assignee: AIRBUS DEFENCE AND SPACE LIMITED, Hertfordshire (GB)

(*) Notice: Subject to any disclaimer, the term of this patent is extended or adjusted under 35 U.S.C. 154(b) by 919 days.

(21) Appl. No.: 16/471,281

(22) PCT Filed: Dec. 8, 2017

(86) PCT No.: PCT/EP2017/082000
§ 371 (c)(1),
(2) Date: Jun. 19, 2019

(87) PCT Pub. No.: WO2018/114391
PCT Pub. Date: Jun. 28, 2018

(65) Prior Publication Data
US 2020/0086688 A1    Mar. 19, 2020

(30) Foreign Application Priority Data
Dec. 20, 2016  (GB) ..................... 1621681

(51) Int. Cl.
*B60C 5/20* (2006.01)
*A61G 5/06* (2006.01)
(Continued)

(52) U.S. Cl.
CPC .................. *B60C 5/20* (2013.01); *A61G 5/06* (2013.01); *B60B 9/18* (2013.01); *B60B 2200/22* (2013.01);
(Continued)

(58) Field of Classification Search
CPC .. B60C 5/20; B60C 7/121; B60C 7/08; A61G 5/06; A61G 5/061; B60B 9/18; B60B 2200/22; B60B 2900/313; B60B 2900/551
See application file for complete search history.

(56) References Cited

U.S. PATENT DOCUMENTS 2,253,230 A * 8/1941 Feldman ................ B60C 5/20
137/853
3,256,123 A * 6/1966 Franka .................. B60C 5/20
53/409
(Continued)

FOREIGN PATENT DOCUMENTS

DE    29906660 U1 * 7/1999  ......... B60C 29/007
DE    10002611 A1 * 8/2001  ............. B60C 5/20
(Continued)

OTHER PUBLICATIONS

International Search Report from related PCT Application No. PCT/EP2017/082000 dated Mar. 13, 2018.
(Continued)

*Primary Examiner* — S. Joseph Morano
*Assistant Examiner* — Emily G. Castonguay
(74) *Attorney, Agent, or Firm* — Burns & Levinson LLP; Joseph M. Maraia; Marlo Schepper Grolnic (57) ABSTRACT

This disclosure relates to a wheel assembly (1) comprising a wheel, a deformable chamber (6) containing a transition substance (15) comprising jamming particles and an interstitial gas, and an actuator (14) configured to transform the transition substance (15) between a fluid state in which the deformable chamber (6) can deform into a conformal state as the wheel encounters an obstacle during use, and a rigid state by evacuation of the interstitial gas in which the transition substance is rigidified to maintain the deformable
(Continued)

chamber (6) in said conformal state to provide increased purchase on said obstacle.

21 Claims, 9 Drawing Sheets

(51) Int. Cl.
    *B60B 9/18*     (2006.01)
    *B60C 7/12*     (2006.01)

(52) U.S. Cl.
    CPC ... *B60B 2900/313* (2013.01); *B60B 2900/551* (2013.01); *B60C 7/121* (2021.08)

(56) References Cited

U.S. PATENT DOCUMENTS

| | | | |
|---|---|---|---|
| 6,725,895 B1* | 4/2004 | Tsipov | B60B 19/04 152/332.1 |
| 8,678,054 B2* | 3/2014 | MacPherson | B60C 7/08 152/306 |
| 2004/0112495 A1* | 6/2004 | Weise | B60C 23/124 152/331.1 |
| 2006/0185911 A1 | 8/2006 | Gunderson et al. | |
| 2013/0233459 A1* | 9/2013 | Hall | B60C 5/22 137/1 |
| 2015/0021873 A1* | 1/2015 | Drury | B60B 19/04 280/80.1 |
| 2020/0086682 A1* | 3/2020 | Allouis | A61G 5/06 |

FOREIGN PATENT DOCUMENTS

| | | |
|---|---|---|
| DE | 102009052253 A1 | 5/2011 |
| EP | 0432079 A2 | 6/1991 |
| FR | 2795947 A1 | 1/2001 |
| JP | 2008018206 A | 1/2008 |
| KR | 20030097218 A | 12/2003 |
| KR | 20110061959 A | 6/2011 |
| WO | 2012153170 A1 | 11/2012 |

OTHER PUBLICATIONS

Search Report from related GB Application No. GB1621681.4 dated Jun. 21, 2017.

\* cited by examiner

WHEEL ASSEMBLY

CROSS-REFERENCE TO RELATED APPLICATIONS

This application is the U.S. national phase entry under 35 U.S.C. § 371 of International Application No. PCT/EP2017/082000, filed Dec. 8, 2017, entitled WHEEL ASSEMBLY, which in turn claims priority to and benefit of United Kingdom Patent Application No. 1621681.4, filed Dec. 20, 2016, the contents of which are incorporated herein by reference in their entirety for all purposes.

FIELD

The present invention relates to a wheel assembly, for example a wheel assembly for a vehicle.

BACKGROUND

Wheels typically include an inflatable tyre that provides traction and shock absorption through deformation of the tyre casing. The deformation of the tyre casing allows for increased grip on obstacles and surfaces. Some wheels have grousers that can dig into a soft obstacle, or abut against a hard one, in order to provide traction for overcoming larger obstacles. Generally, a wheel is only able to overcome an obstacle having a height of less than about one third of the diameter of the wheel.

SUMMARY OF THE INVENTION

According to a first aspect of the invention, there is provided a wheel assembly comprising a wheel, a deformable chamber containing a transition substance comprising jamming particles and an interstitial gas, and an actuator configured to transform the transition substance between:
  a fluid state in which the deformable chamber can deform into a conformal state as the wheel encounters an obstacle during use; and,
  a rigid state in which the transition substance is rigidified by evacuation of the interstitial gas to maintain the deformable chamber in said conformal state to provide increased purchase on said obstacle.

Optionally, the actuator may be configured to move gas into the deformable chamber to transform the transition substance from the rigid state to the fluid state after said obstacle has been overcome. The actuator may comprise a pump.

The wheel may comprise a hub and a rim concentrically mounted to the hub, and the deformable chamber may be disposed outwardly of the rim about at least a portion of the wheel.

The wheel assembly may comprise a plurality of deformable chambers, each chamber extending about a discreet portion of the wheel. In one example, the wheel assembly comprises four deformable chambers. The actuator may be configured to selectively operate the transition substance within each deformable chamber independently of the transition substance within any other deformable chamber.

The wheel may further comprise a plurality of supporting fins extending radially between adjacent deformable chambers.

The wheel may further comprise a compressible layer disposed between the deformable chamber and the wheel. The compressible layer may comprise a pneumatic bladder.

The wheel assembly may further comprise a sensor arranged to detect deformation of the deformable chamber.

Alternatively or additionally, the wheel assembly may further comprise a sensor arranged to detect the presence of an obstacle.

The actuator may be configured to transform the transition substance between the fluid state and the rigid state in response to a signal generated by the sensor.

Additionally or alternatively, the deformable chamber may comprise a self-inflation mechanism 22'. The self-inflation mechanism 22' may comprise a biasing member 29.

Alternatively, in another example, the transition substance may comprise a rheological substance and the actuator may be configured to alter the viscosity of the rheological substance. For example, the rheological substance is a magnetorheological fluid and the actuator comprises an electromagnet. In an alternative example, the rheological substance is an electrorheological fluid and the actuator is configured to generate an electric field.

In other examples, the rheological substance is an electrorheological elastomer and the actuator is configured to generate an electric and/or magnetic field.

The wheel assembly may further comprise a tread disposed outwardly of the deformable chamber to contact the ground during use of the wheel assembly. The tread may comprise a plurality of grousers.

In some examples, the deformable chamber may be attached to the wheel.

The deformable chamber may comprise a flexible wall defining a closed tube.

In some examples, the wheel is a drive wheel configured to be coupled to a drive motor.

According to a further aspect of the invention, there is also provided a vehicle comprising at least one wheel assembly as described above.

According to a further aspect of the invention, there is also provided a wheelchair comprising at least one wheel assembly as described above.

BRIEF DESCRIPTION OF THE DRAWINGS

Embodiments will now be described, by way of example only, with reference to the accompanying drawings, in which.

DETAILED DESCRIPTION

Figure 1:
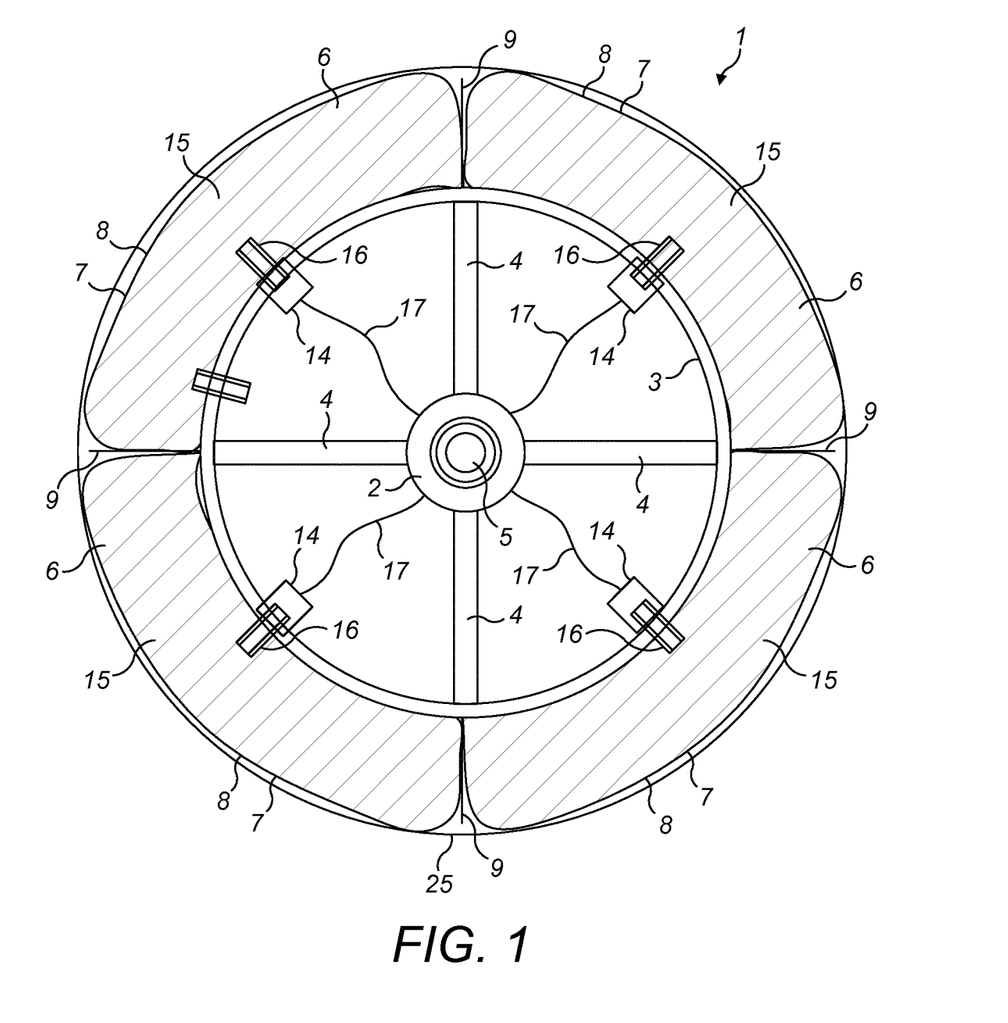
FIG. 1 shows a wheel assembly according to an embodiment of the invention.

An embodiment of a wheel assembly 1 according to the invention is illustrated by FIG. 1. The wheel assembly 1 comprises a wheel that is formed of a hub 2 and a rim 3 concentrically mounted to the hub 2 by a connecting wall 4.

In the embodiments illustrated by FIGS. 1 to 6, the connecting wall 4 comprises a number of spokes arranged between the rim 3 and the hub 2; however other arrangements are equally feasible, for example a solid wheel, or a solid wheel in which cuts outs are made in the connecting wall 4 for lightness. In some examples, the wheel may be formed of a disc.

The illustrated wheel assembly 1 is a drive wheel, meaning that torque is applied to the wheel assembly 1 to provide a driving force. In this example, the axle 5 is a drive axle that is coupled to a motor or other drive means. The drive axle can be coupled to the hub 2 in a number of conventional means, for example a spine or key. However, it will be appreciated that in other examples the wheel may not be a drive wheel, for example the wheel may be a passive trailer wheel or a passive steering wheel.

It will be appreciated that the wheel assembly 1 described herein may be used in a wide variety of different applications. For example, the wheel assembly 1 can be used on a vehicle. In one example, the wheel assembly 1 is used on a wheelchair. In other examples, the wheel assembly 1 is used on a mobility vehicle, for example a mobility scooter. In yet further examples the wheel assembly 1 is used on search and rescue vehicles and specialised off-road vehicles. The wheel assembly 1 may be used on remotely controlled or autonomous vehicles, including space exploration vehicles or vehicles for exploring hazardous environments.

As illustrated, the wheel assembly of FIG. 1 further comprises four chambers 6 arranged about the circumference of the rim 3. Each chamber 6 is enclosed by a continuous flexible wall 7 that forms a closed ended elongate tube 8. Each tube 8 is arranged about a discrete portion of the rim 3 and is closely spaced to an adjacent tube 8 so that the four tubes 8 defining the four chambers 6 provide full coverage of the rim 3.

The chambers 6 are coupled to the rim 3 such that torque can be transferred between the rim 3 and the flexible wall 7. For example, it is envisaged that the flexible wall 7 may be adhered, welded or otherwise attached to an outer surface of the rim 3. To further assist the transfer of torque, supporting fins 9 can optionally be provided between adjacent chambers 6. Each fin 9 extends radially outward of the rim 3 to provide a surface against which a portion of the flexible wall 7 is supported, that is, the portion of wall 7 defining one of the longitudinal ends of the respective tube 8. Therefore, as the wheel 1 is caused to rotate, torque is transferred from the hub 2 to each of the supporting fins 9 and, in turn, to each flexible wall 7 of each respective chamber 6.

Each chamber 6 is filled with a transition substance 15 that is configured to transform from a fluid state that allows the chamber 6 to deform, and a rigid state that maintains the chamber 6 in its deformed state. Therefore, during use, as the wheel assembly 1 encounters an obstacle a chamber 6 can be deformed while the transition substance 15 is in a fluid state. Then, the transition substance 15 can be transformed to its rigid state to maintain the chamber 6 in its deformed shape. This can provide increased purchase on the obstacle, allowing the wheel assembly 1 to more easily overcome the obstacle.

An actuator 14 is provided to effect transformation of the transition substance 15 between the fluid state and the rigid state, as explained further hereinafter.

In normal use, as the wheel 1 rolls along a flat surface, the transition substance 15 is in the fluid state. This allows the wheel 1 to provide a degree of compliancy over irregularities in the surface by displacement of the flexible wall 7, providing traction and shock absorption.

As illustrated by FIGS. 2A to 2E, the wheel is described overcoming a step 10, such as a kerb. The step 10 has vertical ii and horizontal faces 12 that are adjoined by an edge 13. The step 10 has a height that is slightly greater than one half of the diameter of the wheel, meaning that conventional wheels will struggle to overcome this step 10.

Figure 2A:
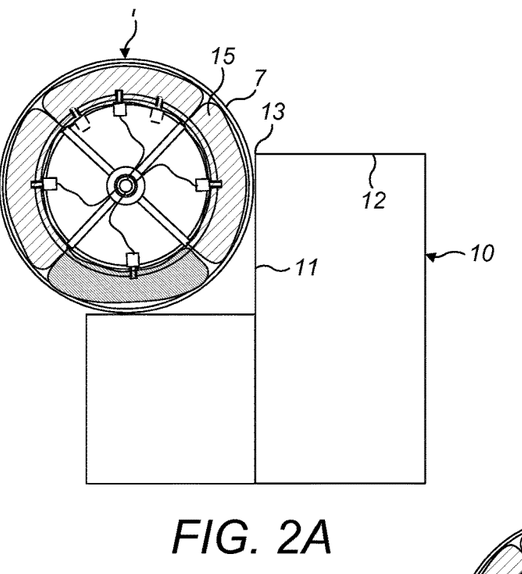
FIGS. 2A to 2E show a chamber of the wheel assembly of FIG. 1 during use.
Figure 2B:
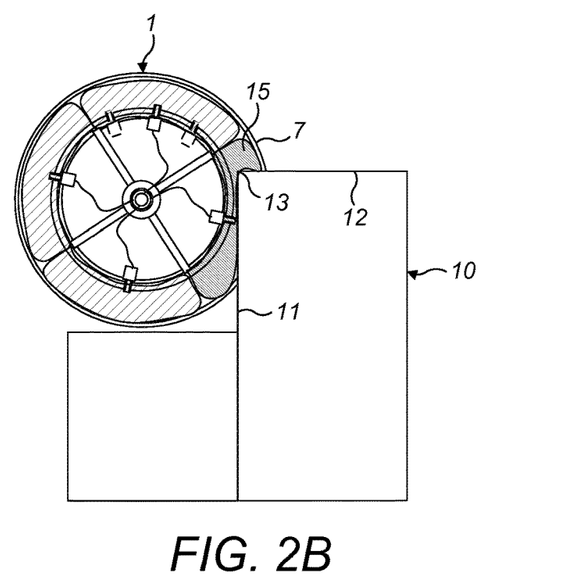

In a first stage of operation of the wheel assembly 1, shown in FIGS. 2A to 2B, the transition 15 substance is in the fluid state. The wheel assembly 1 rolls up against the step 10 so that the flexible wall 7 of the chamber 6 adjacent the step 10 conforms around the edge 13 of the step 10. As shown in FIG. 2B, in the confirmed state the chamber 6 has deformed about the edge 13 such that a part of the chamber 6 overlies the horizontal face 12 of the step. The deformed shape of the chamber 6 is referred to as a conformal shape.

Figure 2C:
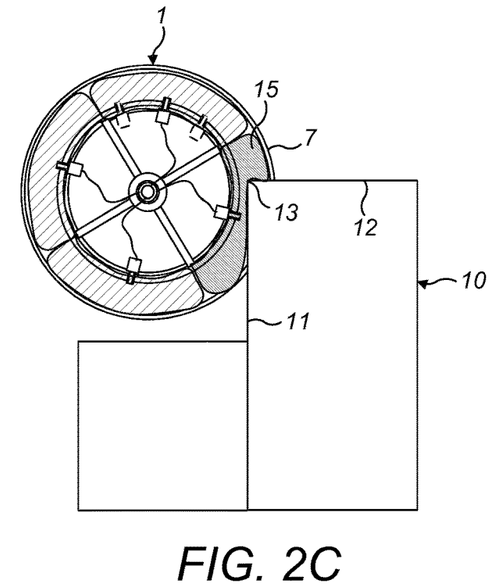
Figure 2D:
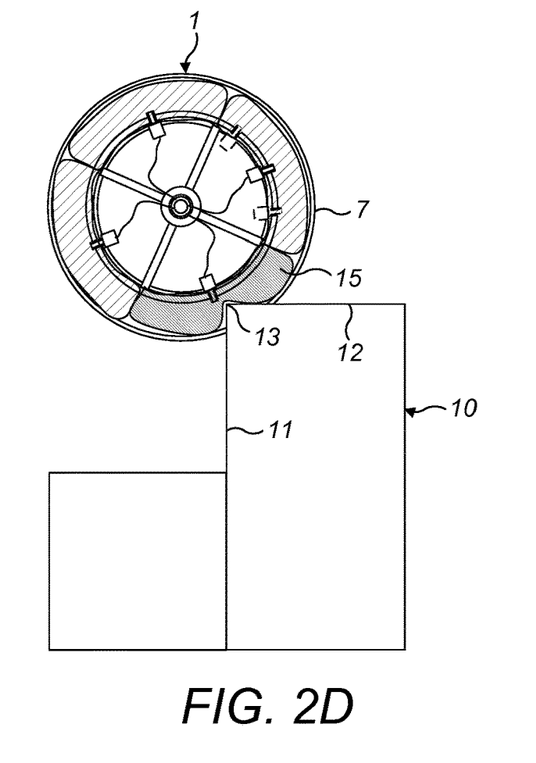

In a second stage of operation, shown in FIGS. 2C to 2D, the actuator 14 is activated and the transition substance 15 is made rigid so as to prevent further deformation of the flexible wall 7 and maintain the chamber 6 in its conformal shape. The deformed flexible wall 7 then effectively acts as a grouser, allowing the portion of the flexible wall 7 in contact with the horizontal face 12 of the step 10 to provide purchase on the step 10 as the wheel 1 is rotated. The wheel assembly 1 may then roll over the edge 13 of the step 10 and onto the horizontal face 12 with reduced risk of slippage.

Figure 2E:
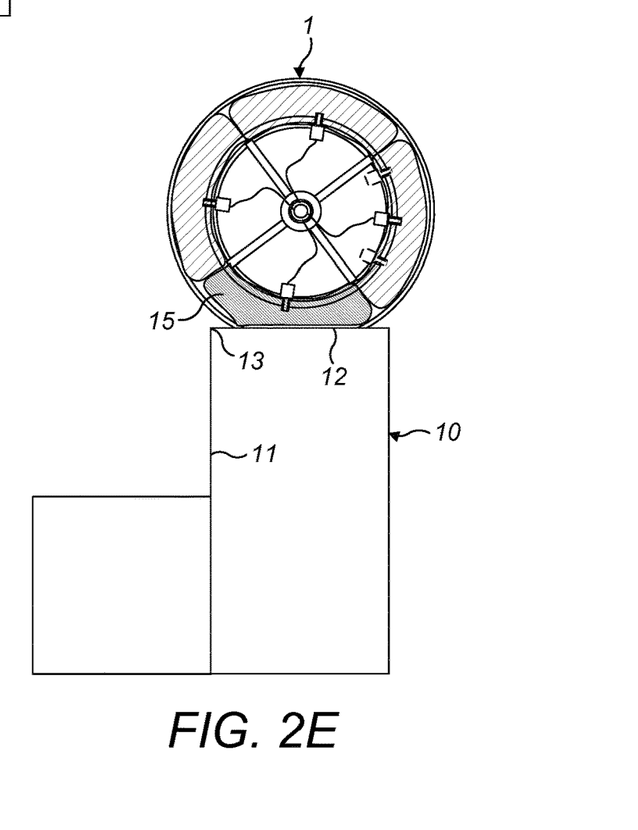

In a third stage of operation, shown in FIG. 2E, the actuator 14 restores the transition substance 15 to its fluid state allowing the flexible wall 7 to take up its natural shape for normal operation.

A first example of the actuator 14 and transition substance 15 will be described with reference to FIGS. 3A to 3C. These FIGS. illustrate one chamber 6 of the wheel assembly 1 described with reference to FIG. 1 to FIG. 2E.

Figure 3A:
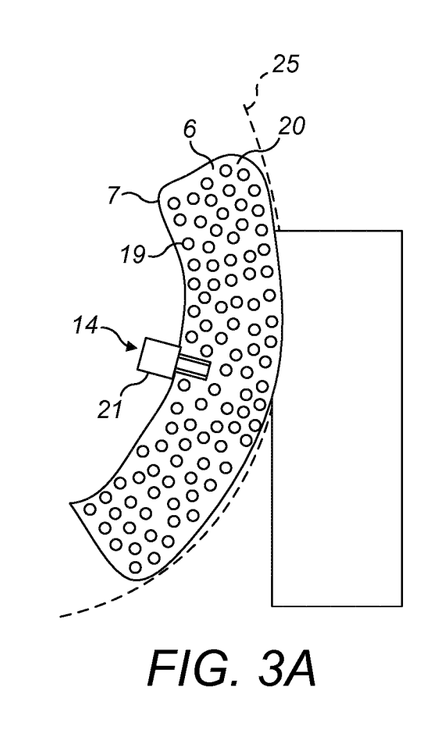
FIGS. 3A to 3C show the wheel assembly of FIG. 1 overcoming an obstacle during use.
Figure 3B:
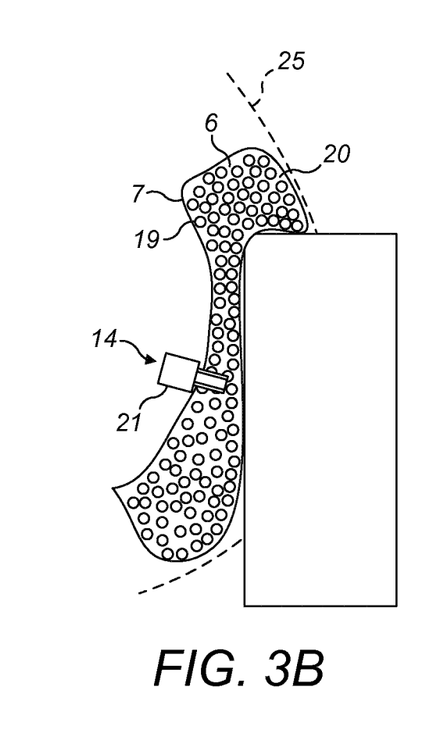
Figure 3C:
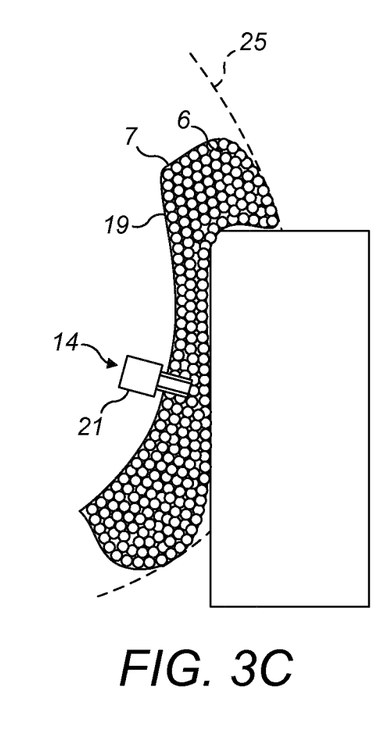

In the embodiment of FIGS. 3A-3C, the transition substance 15 comprises jamming particles 19 and an interstitial gas 20. This embodiment relies on the principle of jamming transition to effect the change between the fluid state and the rigid state, whereby the interstitial gas 20 is evacuated to lock the jamming particles 19 together in the rigid state within the chamber 6.

As shown in FIG. 3A the chamber 6 is filled with interstitial gas 20. Before the wheel assembly 1 encounters an obstacle the compressibility of the gas 20 and flexibility of the flexible wall 7 allows the chamber 6 to conform to the shape of the obstacle. As shown in FIG. 3B, as the chamber 6 comes into contact with the obstacle the flexible wall 7 deforms, allowing the chamber 6 to conform to the shape of the obstacle. Then, as shown in FIG. 3C, the gas 20 is evacuated from the chamber 6, which draws the flexible wall 7 around the jamming particles 19 locking them together so that the flexible wall 7 is rigidified in the deformed state and the chamber 6 is maintained in its conformal state. The rigidified chamber 6 provides increased purchase between the wheel assembly 1 and the obstacle, allowing the wheel to overcome the obstacle as described previously.

Figure 4:
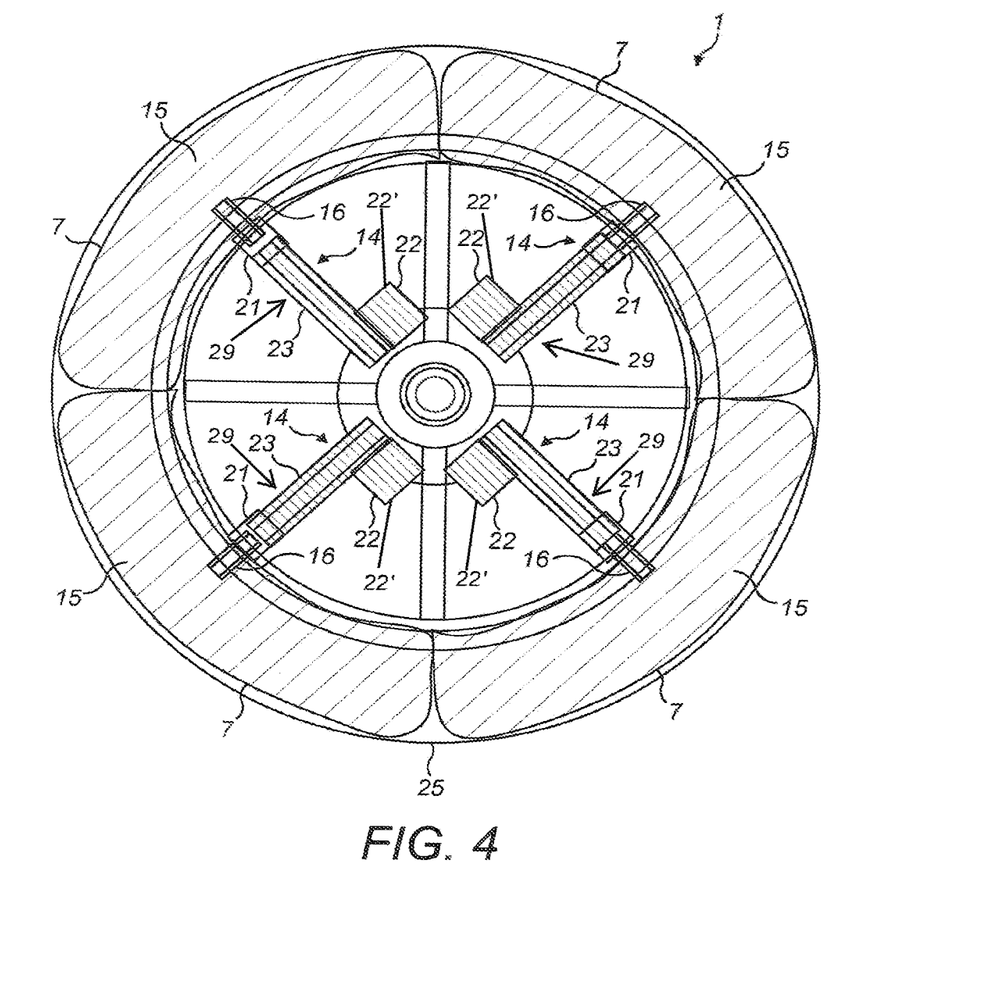
FIG. 4 shows a wheel assembly according to another embodiment of the invention.

As illustrated in FIG. 4, the actuator 14 comprises a pump 22 for evacuating the interstitial gas 20 from the chambers 6. A valve 21 is provided between the pump and each chamber 6. The valve 21 may be opened and closed by the actuator 14. The pump 22 can either be mounted to the wheel 1, as shown, or can be mounted to the vehicle to which the wheel 1 is attached.

To evacuate the interstitial gas 20 the pump 22 is operated until the pressure inside the chamber 6 falls below a threshold level which is below atmospheric pressure. The valve 21 is then closed and the pressure level inside the chamber 6 is maintained. Atmospheric pressure outside the chamber 6 presses the flexible wall 7 against the jamming particles 19, causing them to interlock so that the flexible wall 7 is rigidified. Ideally the flexible wall 7 has some elasticity to minimise the number of folds that form in the wall 7 as the volume of the chamber 6 is reduced.

Preferably, the pump 22 may be reversible in order to restore the transition substance 15 to the fluid state by pumping gas back into the chamber 6. In this case, the valve 21 is opened, the pump 22 is activated and the chamber 6 is inflated, whereupon the valve 21 is again closed to maintain the chamber 6 in its inflated state. Alternatively, as illustrated, a reservoir 23 is provided to store gas that has been removed from the chamber 6. In this case, the pump 22 is operated to deflate the chamber 6 by pumping gas from the chamber 6 into the reservoir 23, whereupon the valve 21 is closed to both retain the gas in the reservoir 23 and to maintain the pressure level in the chamber 6. In order to restore the transition substance 15 to the fluid state the valve 21 is opened and the gas moves back into the chamber 6.

In an alternative example, the interstitial gas 20 is evacuated from the chamber 6 as a result of the pressure applied to the chamber 6 during deformation and/or due to the elastic tension in the flexible wall 7. In these examples, when the valve 21 is opened the volume of the chamber 6 is reduced, forcing out the gas 20. The elastic tension of the wall 7 compresses together the jamming particles 19 causing them to interlock so that the flexible wall 7 is rigidified. A pump may be provided to inflate the chamber 6 once the obstacle has been overcome.

In a further alternative example, gas 20 can be moved back into the chamber 6 by providing a biasing member 29 that re-inflates the reservoir. For example, the chamber may include an elastic member 29 that is compressed as the gas 20 is evacuated, and once the valve 21 is re-opened the biasing member 29 urges the flexible wall 7 into its inflated state, drawing gas 20 through the valve 21 and into the chamber 6.

In examples, the jamming particles of the transition substance 15 may be small individual granules or grains made from any type of metallic, polymer, or other material. In some examples, the jamming particles may be a ground material, for example coffee grounds, ground glass, sand, rice, sawdust, crushed nut shells, oats, cornmeal, salt, seeds. In a preferred example, the jamming particles are small metallic balls, for example ball bearings. In another preferred example, the jamming particles are small plastic beads. In a preferred example, the interstitial gas of the transition substance 15 is air. However, the interstitial gas may be another gas, for example nitrogen, carbon dioxide, or other gas.

Figure 5:
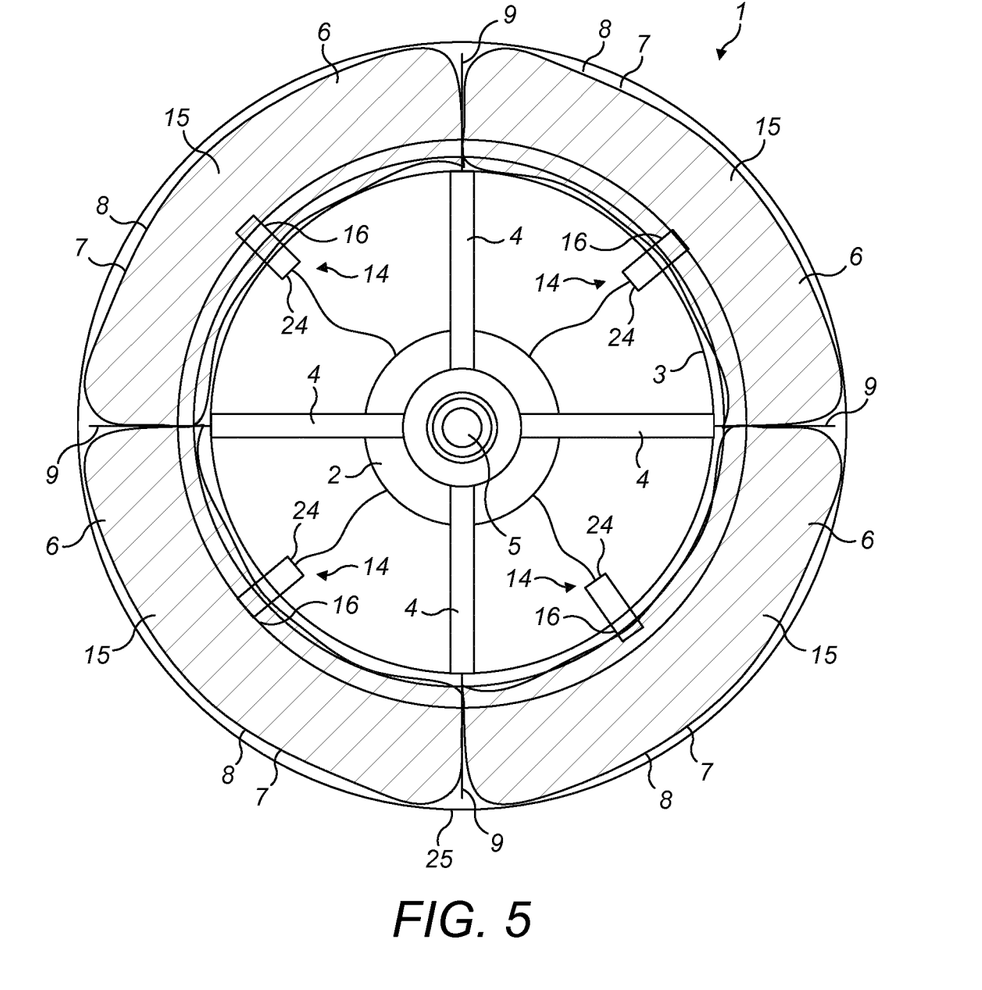
FIG. 5 shows a wheel assembly according to an alternative embodiment.

In an alternative embodiment shown in FIG. 5, in which like features retain the same reference numbers, the transition substance 15 comprises a magnetorheological fluid and the actuator 14 comprises an electromagnet 24. The magnetorheological fluid is configured to change viscosity in response to a magnetic field. The viscosity of the fluid is variable depending on the strength of the magnetic field applied, with an increase in the magnetic field strength causing a corresponding increase in viscosity. In order to transform the magnetorheological fluid from the fluid state to the rigid state, electric power is provided to the electromagnet 24 to generate the magnetic field. The electric power and the corresponding magnetic field strength are great enough to ensure that the magnetorheological fluid is effectively rigid, which maintains the flexible wall 7 and chamber 6 in the conformal state. The fluid state is restored by deactivation of the electromagnet 24 and removal of the magnetic field.

The wheel assembly may include one or more electromagnets 24 per chamber 6. For example, one, two, three or four electromagnets 24 may be required for each chamber 6.

The magnetorheological fluid may be substantially incompressible. Therefore, in order for the flexible wall 7 to conform to an object during the first stage of operation of the wheel 1, the flexible wall 7 is made from a stretchable, elastic material. This ensures that a portion of the flexible wall 7 may conform to the obstacle.

In examples, the magnetorheological fluid of the transition substance 15 comprises a carrier oil and magnetic particles suspended in the carrier fluid, such as oil or water. The magnetorheological fluid optionally further includes a surfactant to prevent settling of the magnetic particles within the carrier fluid. Examples of suitable carrier fluids include silicon oils, mineral oils, paraffin oils, silicone copolymers, white oils, hydraulic oils, synthetic hydrocarbon oil, water, esterified fatty acid, or ferrofluid. Examples of the magnetic particles may include pure iron, iron alloys (incl. cobalt, vanadium manganese, molybdenum, silicon, nickel), carbonyl iron, atomized iron, water-atomized iron, iron oxides (incl. $Fe_2O_3$, $Fe_3O_4$), low carbon steel grades, silicon steel, nickel, cobalt, ferritic stainless steel, atomized stainless steel, and the like.

In yet another example, similar to the magnetorheological fluid example of FIG. 5, the transition substance 15 comprises an electrorheological fluid and the actuator 14 is configured to generate an electric field. The viscosity of the electrorheological fluid is increased by applying an electric filed to the electrorheological fluid. Therefore, the electrorheological transition substance 15 can be transformed between the fluid state and the rigid state.

Preferably, the electrorheological fluid comprises a suspension of fine semi-conducting particles in an electrically-insulating fluid, for example silicone oil.

In other examples, the transition substance 15 may comprise an electrorheological elastomer, and the actuator 14 may be configured to generate an electric and/or magnetic field that alters the stiffness of the electrorheological elastomer.

For example, the electrorheological elastomer may comprise a flexible silicon or rubber material with magnetic and/or charged particles distributed through the material. In this way, a magnetic and/or electric field can be used to control the stiffness of the electrorheological elastomer.

In preferred examples, the wheel assembly 1 described above with reference to any of FIGS. 1 to 5 further includes a processor configured to control the actuator 14 to transform the transition substance between the fluid and rigid states. The wheel assembly 1 may also include one or more sensors. For example, a sensor 16 may be configured to detect deformation of the chamber 6, such that the processor is able to determine when to operate actuator 14. In another example, a sensor may be provided to detect when the wheel assembly 1 is approaching an obstacle, and/or when the wheel assembly 1 is in contact with an obstacle to determine when to operate actuator 14.

A suitable connection 17 is provided to relay signals between the sensor 16, processor and actuator 14, for example a controlled area network, 12 C or RS232 are all viable options amongst others. For practical purposes the processor may be located within the hub 2.

In examples where the transition substance 15 comprises jamming particles and an interstitial gas, as described with reference to FIGS. 3A to 3C, the sensor 16 is a pressure sensor 16 configured to measure the pressure inside the chamber 6. In this way, during the first stage of operation as the flexible wall 7 conforms to the obstacle, the pressure inside the chamber 6 increases and is measured by the sensor 16. The pressure sensor 16 thereby generates a signal which varies in proportion to the deformation of the chamber 6. The signal is relayed to the processor which is configured to activate the actuator 14 when the pressure level increases above a threshold value in order to cause the transition substance 15 to transform from the fluid state to the rigid state. As the actuator 14 evacuates the interstitial gas 20 from the chamber 6, the pressure in the chamber 6 drops. When the pressure level drops below a threshold value, the processor may then activate the lockable valve 21 to retain the flexible wall 7 in the rigid state.

Such a pressure sensor 16 may also be used with examples where the transition substance 15 is a rheological fluid, either a magnetorheological fluid or an electrorheological fluid, as described above. In these examples, as the chamber 6 is deformed the internal pressure will increase, which can be detected by a pressure sensor 16, and the actuator 14 can transform the transition substance 15 from the fluid to the liquid state once a threshold pressure has been reached.

Alternatively, in an unillustrated example, the sensor 16 may be a deformation sensor that detects the deformation of the chamber 6 of any of the above-described examples. For example, the sensor may be an optical sensor, for example a camera, which is positioned on the wheel assembly 1 or vehicle and visually detects engagement between the wheel assembly 1 and obstacles. In other examples, the sensor 16 may be a physical pressure sensor, for example a piezo electric sensor, arranged to detect engagement between the wheel assembly 1 and obstacles. In other examples, the sensor may be a proximity sensor arranged to detect when one part of the flexible wall 7 is proximate to another part, thereby determining deformation of the chamber 6. In each case, the processor is configured to operate the actuator 14 in dependence on the detected obstacle or deformation.

In further examples, the wheel assembly may include an angular position sensor configured to generate a signal indicative of the part of the wheel assembly 1, in particular which chamber 6 on the wheel assembly 1, is in contact with the obstacle. This angular wheel position may be used by the processor to determine which chamber 6 has been deformed, and therefore which chamber 6 to transform from the fluid state to the rigid state. The sensor 16 can also be used to determine when to change the transition substance 15 from the rigid state to the fluid state after an obstacle has been overcome.

Figure 6:
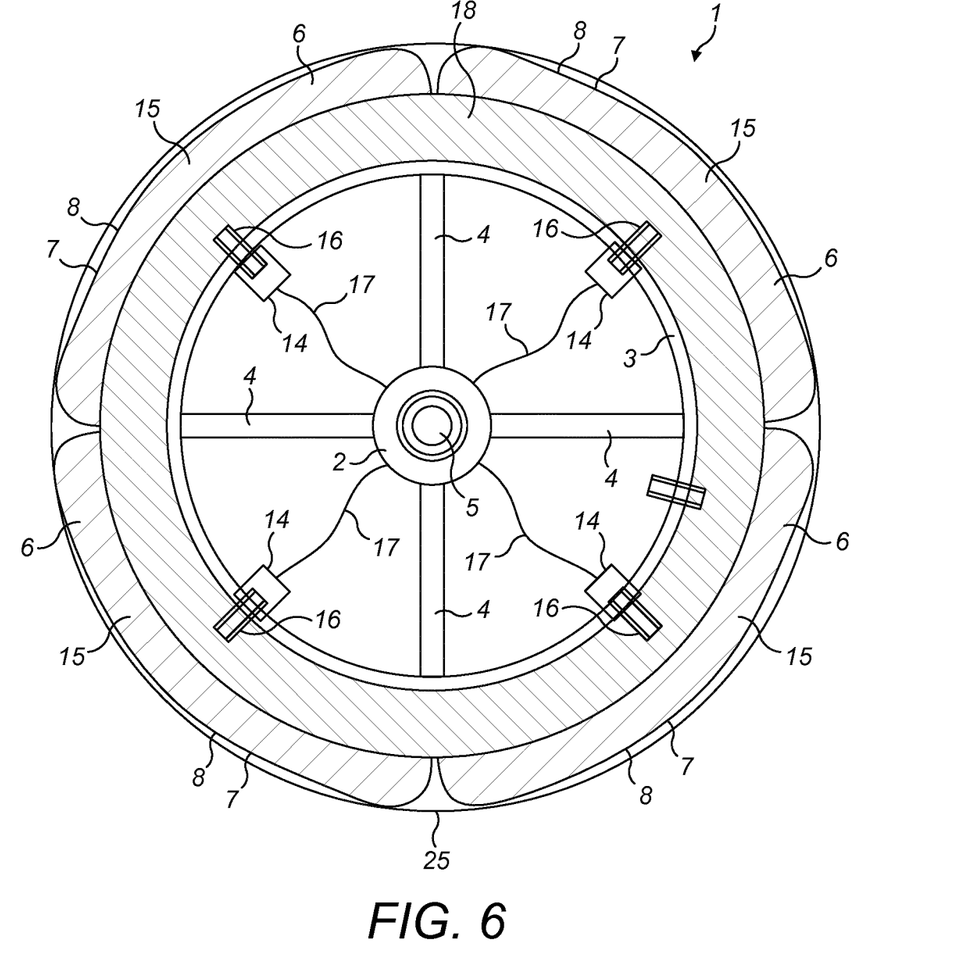
FIG. 6 shows a wheel assembly according to another embodiment of the invention.

In further examples, the wheel assembly 1 of any of the above-described examples may additionally comprise a compressible layer 18 that extends around the rim 3. In this embodiment, the chambers 6 are arranged around the compressible layer 18. The compressible layer 18 is preferably formed from a pneumatic bladder, but could alternatively be a compressible material such as rubber. The compressible layer 18 spaces the chambers 6 from the rim 3 of the wheel 1. This allows localised areas of a chamber 6 to be displaced into the compressible layer 18 during deformation, and once the transition substance 15 is rigidified the compressible layer 18 will be held in a deformed state. This in turn provides the flexible wall 7 with a greater range of movement for a given chamber 6 size, increasing the size of the contact patch between the flexible wall 7 and the obstacle.

As shown in FIGS. 1 to 6, the wheel assembly 1 may further comprise an outer flexible tread 25 that extends around the wheel 1 outward of the chambers 6, so as to be contactable with the ground during use. The flexibility of the tread 25 allows the tread 25 to conform to the shape of an obstacle with the chamber 6 underneath. The tread 25 may be made from any high friction material and may further comprise a tread pattern to assist with water displacement and/or for increased traction on soft surfaces. In a preferred embodiment, the tread 25 is made from a synthetic rubber. In another example, the tread 25 is made from a flexible metal and includes grousers for increasing traction. In another embodiment, the tread 25 is a tyre casing that extends around the sides of the chambers 6 and into contact with the rim 3 to completely enclose the chambers 6.

The tread 25 may be adhered to the flexible wall 7 of the chambers 6 using a suitable adhesive or welding technique. In embodiments where the tread 25 extends into contact with the rim 3, the tread 25 may grip the rim 3 by cooperation of flange portions (not shown) on the rim 3 and a corresponding lip on edges of the tread 25.

In the above described embodiments the wheel assembly 1 comprises four chambers 6. However, the invention is not limited to four chambers 6 and any appropriate number of chambers 6 is envisaged. For example, in a simplified embodiment, a single chamber 6 is provided that extends about the entire rim 3. In other examples, the wheel assembly 1 includes 2 chambers, 3 chambers, 5 chambers, 6 chambers or more.

A greater number of chambers 6 might be provided for greater control over discrete portions of the wheel 1. Therefore, wheels with a larger circumference will include more chambers 6. Increasing the number of chambers 6 in this way can allow two or more portions of the wheel 1 occupied by individual chambers 6 to respond separately to complex obstacles, or when obstacles are immediately adjacent one another, such as adjacent steps along a flight of stairs. In this instance the flexible wall 7 of one chamber 6 may rigidify about the first step while the flexible wall 7 of the adjacent chamber 6 conforms to the second step.

Further, a wheel 1 that is wider in an axial direction may have two or more chambers 6 positioned side by side so as to cover the full width of the wheel 1.

Figure 7:
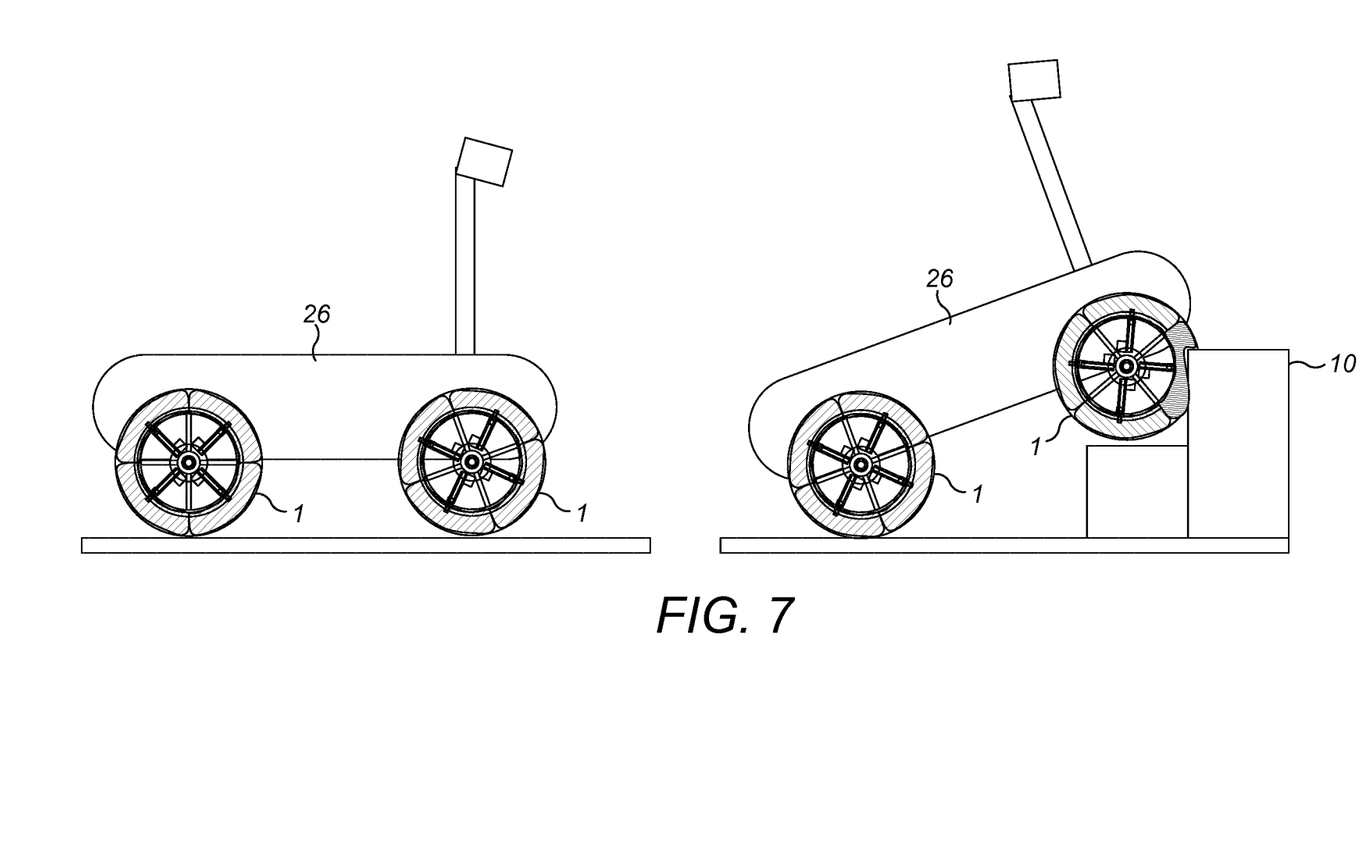
FIG. 7 shows a vehicle that includes the wheel assembly; and,
  FIG. 8 shows a wheelchair that includes the wheel assembly.

FIG. 7 shows a vehicle 26 that includes several of the wheels 1 described above. In particular, FIG. 7 illustrates a rover vehicle, which may be remotely controlled or autonomous. The vehicle 26 includes the wheels 1 in the front and rear, but it will be appreciated that the wheels 1 may be used only on the front, or only on the rear. FIG. 7 also illustrates the vehicle 26 climbing a step 10. Such a vehicle 26 may be used in search and rescue, defence applications, or industrial applications. Alternatively, such a vehicle 26 may be used for exploration.

Figure 8:
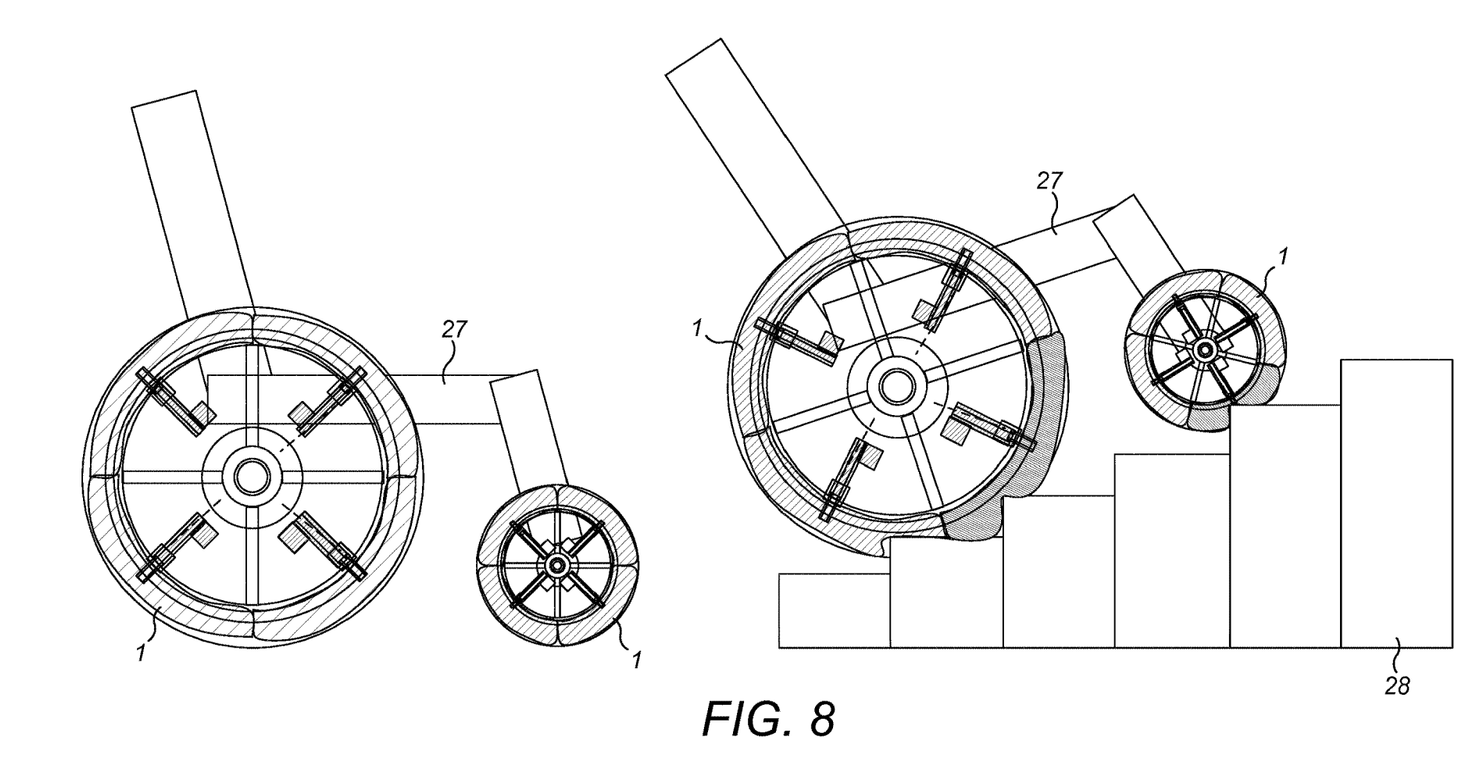

FIG. 8 shows a wheelchair 27 that includes several of the wheels 1 described above. The wheelchair may include a motor for driving at least one of the wheels 1, for example the rear wheels. The wheelchair 27 includes the wheels 1 in the front and rear, but it will be appreciated that the wheels 1 may be used only on the front, or only on the rear. FIG. 8 also illustrates the wheelchair 27 climbing a series of steps 28. In addition, the wheels 1 described above may be used on other mobility vehicles, for example a wheeled-walker or a mobility scooter.

It will be appreciated that the foregoing description is given by way of example only and that modifications may be made to the wheel assembly of the present invention without departing from the scope of the appended claims.

The invention claimed is:

1. A wheel assembly comprising a wheel, a deformable chamber containing a transition substance comprising jamming particles and an interstitial gas, and an actuator configured to transform the transition substance between:
   a fluid state in which the deformable chamber can deform into a conformal state as the wheel encounters an obstacle during use; and,
   a rigid state in which the transition substance is rigidified by evacuation of the interstitial gas, wherein the interstitial gas is evacuated to lock the jamming particles together in the rigid state within the chamber to maintain the deformable chamber in said conformal state to provide increased purchase on said obstacle.

2. The wheel assembly according to claim 1, wherein the actuator is configured to move gas into the deformable chamber to transform the transition substance from the rigid state to the fluid state after said obstacle has been overcome.

3. The wheel assembly according to claim 1 wherein the actuator comprises a pump.

4. The wheel assembly according to claim 1, wherein the wheel comprises a hub and a rim concentrically mounted to the hub, the deformable chamber being disposed outwardly of the rim about at least a portion of the wheel.

5. The wheel assembly according to claim 4, wherein the wheel assembly comprises a plurality of deformable chambers, each chamber extending about a discreet portion of the wheel.

6. The wheel assembly according to claim 5, wherein the wheel assembly comprises four deformable chambers.

7. The wheel assembly according to claim 5 wherein the actuator is configured to selectively operate the transition substance within each deformable chamber independently of the transition substance within any other deformable chamber.

8. The wheel assembly according to claim 5, wherein the wheel further comprises a plurality of supporting fins extending radially between adjacent deformable chambers.

9. The wheel assembly according to claim 1, wherein the wheel further comprises a compressible layer disposed between the deformable chamber and the wheel.

10. The wheel assembly according to claim 9, wherein the compressible layer comprises a pneumatic bladder.

11. The wheel assembly according to claim 1, further comprising a sensor arranged to detect deformation of the deformable chamber.

12. The wheel assembly according to claim 1, further comprising a sensor arranged to detect the presence of an obstacle.

13. The wheel assembly according to claim 11, wherein the actuator is configured to transform the transition substance between the fluid state and the rigid state in response to a signal generated by the sensor.

14. The wheel assembly according to any preceding claim 1, further comprising a tread disposed outwardly of the deformable chamber to contact the ground during use of the wheel assembly.

15. The wheel assembly according to claim 1, wherein the deformable chamber is attached to the wheel.

16. The wheel assembly according to claim 1, wherein the deformable chamber comprises a flexible wall defining a closed tube.

17. The wheel assembly according to claim 1, wherein the wheel is a drive wheel configured to be coupled to a drive motor.

18. The wheel assembly according to claim 1, wherein the deformable chamber comprises a self-inflation mechanism.

19. The wheel assembly according to claim 18, wherein the self-inflation mechanism comprises a biasing member.

20. A vehicle comprising at least one wheel assembly according to claim 1.

21. A wheelchair comprising at least one wheel assembly according to claim 1.

* * * * *